US009276996B2

(12) United States Patent
Vetter et al.

(10) Patent No.: US 9,276,996 B2
(45) Date of Patent: Mar. 1, 2016

(54) APPARATUS FOR SERVICING A FIELD DEVICE FROM A REMOTE TERMINAL

(75) Inventors: Immanuel Vetter, Sinzheim (DE); Vincent De Groot, St. Louis (FR); Jörg Hähniche, Bad Krozingen (DE); Dennis Juillet, St. Louis (FR); Martin Lohmann, Gerlingen (DE); Günter Jahl, Löchgau (DE); Thomas Hartmann, Ravensburg (DE); Stefan Robl, Gladbach (DE); Holger Eberhard, Stuttgart (DE); Florian Fetz, Stuttgart (DE)

(73) Assignee: ENDRESS + HAUSER PROCESS SOLUTIONS AG, Reinach (CH)

( * ) Notice: Subject to any disclaimer, the term of this patent is extended or adjusted under 35 U.S.C. 154(b) by 117 days.

(21) Appl. No.: 13/386,489

(22) PCT Filed: Jun. 22, 2010

(86) PCT No.: PCT/EP2010/058815
§ 371 (c)(1),
(2), (4) Date: Apr. 4, 2012

(87) PCT Pub. No.: WO2011/012378
PCT Pub. Date: Feb. 3, 2011

(65) Prior Publication Data
US 2012/0182119 A1   Jul. 19, 2012

(30) Foreign Application Priority Data
Jul. 28, 2009 (DE) .......................... 10 2009 028 051

(51) Int. Cl.
G05B 19/02 (2006.01)
H04L 29/08 (2006.01)
H04W 4/00 (2009.01)

(52) U.S. Cl.
CPC ............ *H04L 67/025* (2013.01); *H04L 67/125* (2013.01); *H04W 4/008* (2013.01); *G05B 2219/31121* (2013.01); *G05B 2219/34444* (2013.01)

(58) Field of Classification Search
CPC .......................... G08C 17/02; H04L 29/08072
USPC .............. 340/10.41; 700/7, 86, 286; 705/308; 709/203, 219; 711/118; 715/205
See application file for complete search history.

(56) References Cited

U.S. PATENT DOCUMENTS

2002/0038346 A1 * 3/2002 Morrison et al. ............. 709/205
2002/0198473 A1   12/2002 Kumar
(Continued)

FOREIGN PATENT DOCUMENTS

DE   19846596 A1   4/1999
DE   10151117 A1   5/2003
(Continued)

OTHER PUBLICATIONS

German Search Report.
(Continued)

*Primary Examiner* — Benjamin C Lee
*Assistant Examiner* — Israel Daramola
(74) *Attorney, Agent, or Firm* — Bacon & Thomas, PLLC

(57) ABSTRACT

An apparatus for servicing a field device from a remote terminal, wherein the field device has an onsite display/servicing capability and is connected to a fieldbus of process automation technology. The remote terminal and the field device communicate with one another via at least one defined transmission protocol. A web server is integrated in the field device, in a Plant Access Point or in the remote terminal; the web server provides all requested device information, which is the so called firmware, of the field device in the form of dynamically produced contents to the remote terminal. A communication driver specific to the applied transmission protocol and a browser are integrated in the remote terminal. The communication driver emulates the protocol of the onsite display/servicing capability of the field device on the remote terminal and the dynamically produced contents are displayed on a display of the remote terminal via the web browser, so that the onsite display/servicing capability at the field device and the display/servicing capability at the remote terminal are identical.

9 Claims, 3 Drawing Sheets

(56) References Cited

U.S. PATENT DOCUMENTS

| | | |
|---|---|---|
| 2004/0098143 A1 | 5/2004 | Fehrer |
| 2004/0230899 A1* | 11/2004 | Pagnano et al. ............... 715/513 |
| 2005/0155043 A1 | 7/2005 | Schulz |
| 2006/0277275 A1* | 12/2006 | Glaenzer ...................... 709/219 |
| 2007/0038700 A1* | 2/2007 | Eryurek et al. ............. 709/203 |
| 2009/0059814 A1 | 3/2009 | Nixon |
| 2009/0062931 A1* | 3/2009 | Keyes et al. ..................... 700/7 |
| 2009/0072951 A1* | 3/2009 | Alberth et al. ............. 340/10.41 |
| 2009/0319062 A1* | 12/2009 | Schwalbe ...................... 700/86 |
| 2010/0198736 A1* | 8/2010 | Marino ........................ 705/308 |
| 2010/0318740 A1* | 12/2010 | Guerrasio .................... 711/118 |
| 2011/0160923 A1* | 6/2011 | Vetter et al. .................. 700/286 |

FOREIGN PATENT DOCUMENTS

| | | |
|---|---|---|
| DE | 10243782 A1 | 3/2004 |
| EP | 1653308 A1 | 5/2006 |

OTHER PUBLICATIONS

International Search Report.
Wolgang Kastner, "EDDL inside FDT/DTM", Factory Communication Systems, 2004, IEEE International Workshop, Sep. 22-24, 2004, New Jersey.
Robert Itschner et al., "Glass: Remote Monitoring of Embedded Systems in Power Engineering", IEEE Internet Computing, IEEE Service Center, New York, 1998.

* cited by examiner

APPARATUS FOR SERVICING A FIELD DEVICE FROM A REMOTE TERMINAL

TECHNICAL FIELD

The invention relates to an apparatus for servicing a field device from a remote terminal.

BACKGROUND DISCUSSION

The terminology 'servicing field devices' means, the configuring and parametering of field devices, but includes, however, also, diagnosis for the purpose of early detection of defects in one or more field devices or in the process. Besides the remote servicing of a field device from a remote terminal, any type of information transfer is furthermore understood under the term 'servicing'. The focus in this context is on the transfer of the parametering of the field device from the field device to the remote terminal as well as the playback of the parametering of the field device by the remote terminal to the field device. As well as the parametering of the field device, the generation of a print version for the purpose of printing by a printer is likewise understood under 'servicing'. In general, the remote terminal is understood to be, for example, a PC, a configuration/management system, for example, the configuration tool FieldCare, which is made and sold by the assignee, or a handheld device of any kind. Field devices serving to register and/or influence process variables are often applied in process automation technology as well as in manufacturing automation technology. Measuring devices such as, for example, fill level measuring devices, flow measuring devices, pressure and temperature measuring devices, pH measuring devices, conductivity measuring devices, etc., which register the corresponding process variables fill level, flow, pressure, temperature, pH value, or conductivity serve to register process variables. Actuators, such as valves or pumps, via which e.g. the flow of a liquid in a pipeline or the fill level of a medium in a container is changed, are used to influence the process variables. In principle, all devices, which are applied near to the process and deliver or process information relevant to the process, are referred to as field devices. A large number of such field devices are available from the Endress+Hauser group of companies. Thus, all types of measuring devices and actuators are subsumed under the term field device used in connection with the invention. Furthermore, the term field device also means e.g. a gateway, a radio adapter or other bus participant integrated/integrable in a bus system.

In modern industrial plants field devices are, as a rule, connected to at least one superordinated control unit via bus systems such as, for example, Profibus® PA, Foundation Fieldbus® or HART®. Normally, the superordinated control unit, as already mentioned, is a control system or a control unit specified in detail earlier. The superordinated control unit serves for process control, process visualizing, process monitoring as well as for the start up and servicing of the field devices. Programs for such purposes run independently in superordinated units and include, for example, the FieldCare tool of the Endress+Hauser group of companies, the Pactware tool, the AMS tool of Fisher-Rosemount or the PDM tool of Siemens. Servicing tools integrated in control system applications include PCS7 of Siemens, Symphony of ABB and Delta V of Emerson.

The integration of field devices in configuration systems or management systems or superordinated control units occurs via device descriptions, which ensure that the superordinated units can detect and interpret the information delivered by the field devices. The device descriptions for each field device type or for different applications of each field device type are provided by the respective device manufacturer. Different device descriptions must be created for the different fieldbuses so that the field devices can be integrated in different fieldbus systems. Thus there are HART device descriptions, Fieldbus Foundation device descriptions and Profibus device descriptions, just to name a few examples.

For the purpose of creating a unitary description for the field devices, the Fieldbus Foundation (FF), the HART Communication Foundation (HCF) and the Profibus Nutzerorganisation (PNO) have created a unified electronic device description (Electronic Device Description EDD). The EDD is defined in standard IEC 61804-2.

Moreover, particular device descriptions, so called DTMs—Device Type Managers, or device managers, or device drivers for comprehensive servicing of the field devices are obtainable. These DTMs correspond to the FDT—Field Device Tool—specification. Each current FDT specification is available from ZVEI, PNO, or the FDT Group.

Many field device manufacturers already deliver the corresponding DTMs or device descriptions with their field devices. The DTMs encapsulate all device specific data, functions and servicing rules, such as e.g. the device structure, the available communication possibilities and the graphical user interface, i.e GUI, for a given field device or for a given field device type.

DTMs require a frame application, here an FDT frame, as a runtime environment. The frame application and the corresponding DTMs permit a very convenient access to field devices, e.g. to device parameters, measured values, diagnostic information, status information, etc., as well as the invocation of special functions available to individual DTMs. For the DTMs of different manufacturers to correctly function in the frame application, the interfaces to the frame application and the remaining DTMs must be clearly defined. This interface definition is encompassed by the acronym FDT. FDT technology unifies the communication interface between field devices and the superordinated control unit. A special feature of FDT technology is that it functions independently of the installed communication protocol as well as the respective software environment of both the field device as well as the superordinated control unit. FDT enables access to any field device via any superordinated control unit using any protocol. A known FDT frame is the previously mentioned FieldCare of the Endress+Hauser Group.

From the above discussion it can be easily seen that the number of DTMs or device descriptions is very large and that the number of DTMs continually increases due to the continually increasing number of devices and fieldbuses. Consequently, a so called DTM library is often discussed. The effort, which must be spent for the installation of the device driver for the communication hardware, the communication DTMs, the DTMs of the field devices and the software for the frame application, or the FDT servicing software, is very high. Usually, the DTMs are delivered via a separate medium, e.g. on a CD or via the internet, and then installed in the superordinated control unit.

The known solution can lead to problems in the following cases:
  A device driver and the current firmware (specific device information from the manufacturer) stored in the field device are not absolutely consistent.
  If the current or appropriate device drivers are not present, the field device cannot be integrated in the control system or the superordinated control unit.

The device driver for the previous version is not always compatible with the device driver of a newer device version.

The onsite servicing of the field device is run under a special protocol, with whose help the corresponding information is displayed onsite.

SUMMARY OF THE INVENTION

An object of the invention is to provide an apparatus, which assures that a field device integrated in a fieldbus can be serviced from a remote terminal at any time.

The object is achieved by feature as follows. The field device has an onsite display/servicing capability and is linked to a process automation technology fieldbus. The remote terminal and the field device communicate with one another using at least one defined transmission protocol. A web server is integrated in the field device; the web server provides each piece of requested device information of the field device, here especially the firmware of the field device, in the form of dynamically produced contents, to the remote terminal using at least one transmission protocol; wherein at least one communication driver specific to the applied transmission protocol and a browser, a standard display browser, for example, are provided for the remote terminal. The browser can call up the information of a field device to be displayed, for example, the parameters, from the field device. The communication driver emulates the protocol of the onsite display/servicing of the field device on the remote terminal so that the dynamically, thus currently, produced contents are displayed on the remote terminal via the browser. In this way it is assured that the onsite display/servicing at the field device and the display/servicing at the remote terminal are identical at any time. The dynamically produced contents are preferably web pages. Software, which is stored in a field device, is understood as firmware.

In general it can be said that the device specific information stored in a field device contains the correct current information. The truth is thus in the field device. By means of the solution of the invention, the consistency between this device specific information implemented in the field device and the information at the remote terminal is assured at any time, since a one to one association between the field device and the remote terminal takes place. Especially advantageous is that a current device driver library must not be installed on the remote terminal.

As mentioned above in connection with the invention, it is seen as especially advantageous when the remote terminal is a PC, a configuration/management system, for example, the configuration system FieldCare, which is made and sold by the assignee, or a handheld servicing device. It can also be a control/control unit, which is made and sold by the Endress+Hauser Group under the mark LIQUILINE. Other embodiments of the remote terminal are presented in detail later.

In an advantageous embodiment of the apparatus of the invention, it is provided that the communication driver is a generic driver. In this connection, a generic driver is one that is the same for any field device connected to the fieldbus. The communication driver can also be embodied so that it can service different fieldbus protocols. The communication driver is responsible for establishing the connection between the field device and the remote terminal and for the representation of information on the display unit associated with the remote terminal. The web server integrated in the field device furnishes all information requested by the remote terminal device in the form of dynamically produced contents, especially web pages, on the display of the remote terminal. The device specific information is, thus, removed from the conventional device driver and is made available upon request by a web server implemented in the field device.

The web browser associated with the remote terminal can be integrated in a separate driver or in the generic communication driver, which is also associated with the remote terminal.

In a preferred variant, the web server is integrated in a Plant Access Point. To this is provided the protocol for the display/servicing of the field device; the PAP is connected to the web browser of any client via a TCP/IP connection. The client can be, for example, one of the field devices connected to the fieldbus. In this connection, it is considered very advantageous when the Plant Access Point is connected with an asset management tool. A corresponding asset management tool is made and sold by the assignee under the mark W@M.

In the state of the art, a Plant Access Point is utilized to provide data from field devices, e.g. generic information such as profile information, measured values or device specific information, which were previously configured, to the servicing personnel of the system. The provision of data occurs either via HTML pages, via XML files or via device drivers. Furthermore, the utilization of Plant Access Points is known to enable the asset management tool to access field devices for the purpose of parametering or diagnosis/monitoring.

The known solutions have the disadvantage that only a generic servicing of a field device is possible. This occurs, for example, based on device profile information (Profibus PA profile 3.01) or the corresponding device drivers are required.

In an embodiment of the invention, in which a Plant Access Point connected to any kind of display unit is utilized as the remote terminal, a Plant Access Point webpage is provided with the assistance of an emulation of the onsite servicing of a field device; and, in turn, the Plant Access Point webpage is connected to the web browser of any client via e.g. a TCP/IP connection. The emulation is preferably achieved in that the display protocol of a field device is transmitted to the field device via the fieldbus and the Plant Access Point. The advantage of this embodiment is to be seen in the fact that field devices unknown to the Plant Access Point can then be serviced by the service personnel. Due to the web pages made available, the servicing is always identical with the onsite servicing on the display of the field device.

Preferably, the transmission protocol for the fieldbus level is a conventional fieldbus protocol used in process automation. Such protocols are especially the HART protocol, the Profibus PA protocol, the Fieldbus Foundation protocol or, preferably, the TCP/IP protocol. Of course, it can also be a proprietary protocol of the field device manufacturer.

In an advantageous embodiment of the apparatus of the invention and all of its embodiments mentioned earlier, a transmission connection is provided, via which at least one transmission protocol is transmittable wirelessly or over a wire. Furthermore, it is provided that the protocol of the onsite display/servicing is transmittable via a wireless or a hardwired communication connection. Preferably, the wireless communication connection is a wireless HART connection, a WLAN connection, Ethernet or GPRS.

In an advantageous embodiment of the apparatus of the invention, the connection to a wireless HART field device is provided via a selection list (such as a list box or a drop-down list) by means of a wireless HART gateway.

Moreover, according to an advantageous form of embodiment of the solution of the invention, an RF/ID chip, which makes the required information for the connection to a wireless HART field device available, is provided in the variants with and without a gateway.

In a preferred embodiment of the solution of the invention, the field device is embodied as a control/evaluation unit, which has a number of channels, via which the sensors/actuators are connected. In other words, the control/evaluation unit is able to support both single channel as well as multichannel embodied generic sensor/actuator connections. The sensors/actuators can be quite different types of sensor elements or measuring transducers, since it is possible to operate these without a problem according to the invention using the customary control systems available in the market. The invention enables plug and play capable embodiment of the most varied types and sensors, measuring transducers or actuators at the fieldbus level.

In the following, a concrete example will now be described, which will elucidate the enormous advantage of the invention: The control/evaluation unit has eight channels and supports five sensor types. Thus, five to the eighth—390,625—combinations are possible. Concretely, the control/evaluation unit is e.g. an apparatus made and sold by the ENDRESS+HAUSER Group under the mark LIQUILINE. In order to be able to service all these combinations/variants, the solutions known from the state of the require a very great effort, which leads to very complex and difficult to maintain device drivers. According to the invention, however, a change of the combination, a change of the supported sensor/actuator types or a change in the channel number has no effect on the generic device driver. The generic device driver in all variants mentioned above always remains unchanged. Of course, the invention is not limited to the application of this special communication connection. A further advantage is to be seen in the fact that the end user of the device driver does not have to install a new device driver in the case of a functional change of the device software, e.g the firmware; in fact, the present driver supports, in principle, all future device functions, since the field device delivers dynamically produced contents for the new functionalities to the device driver.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
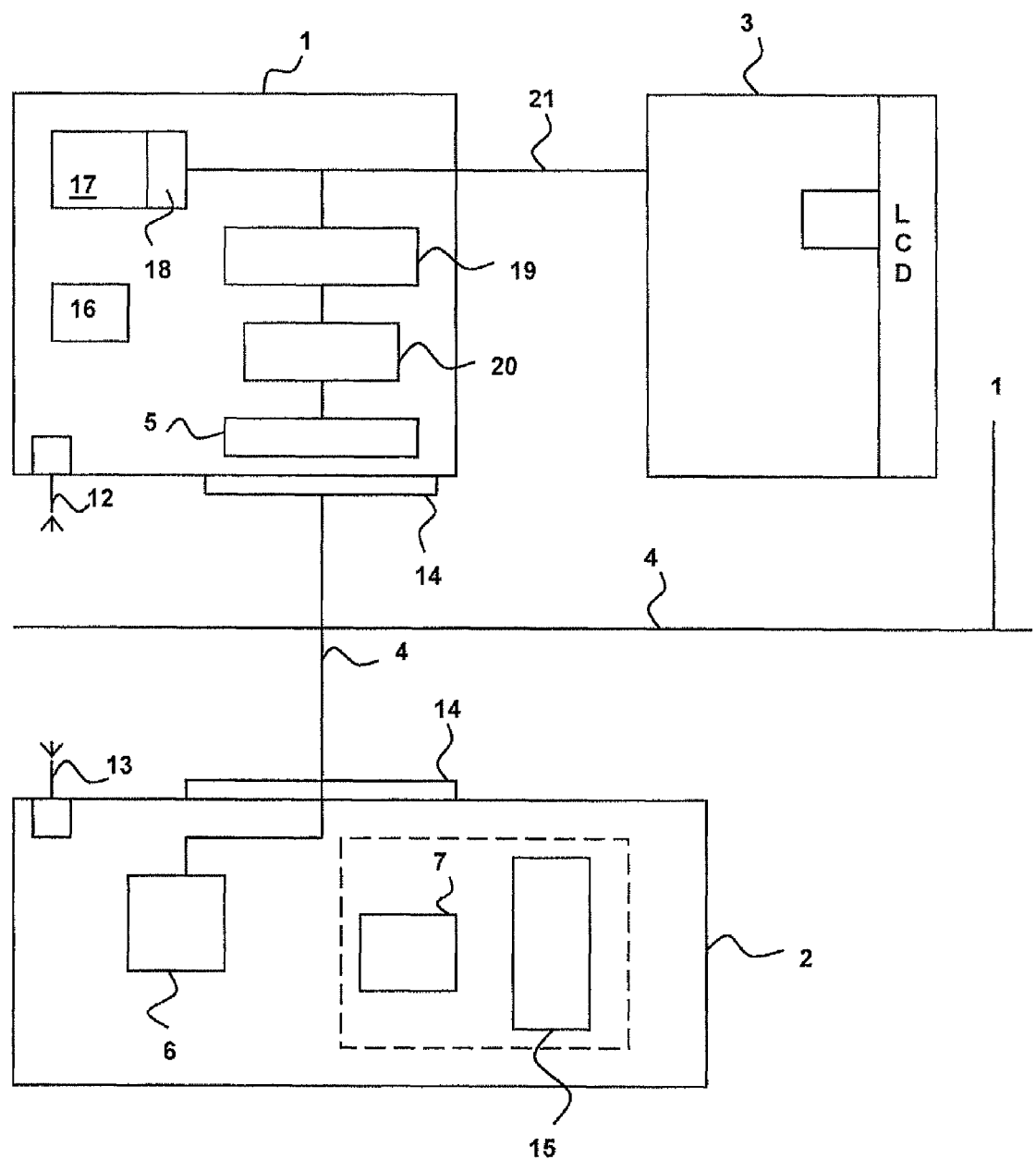
FIG. 1 is a schematic representation of a first embodiment of the apparatus of the invention.
Figure 3:
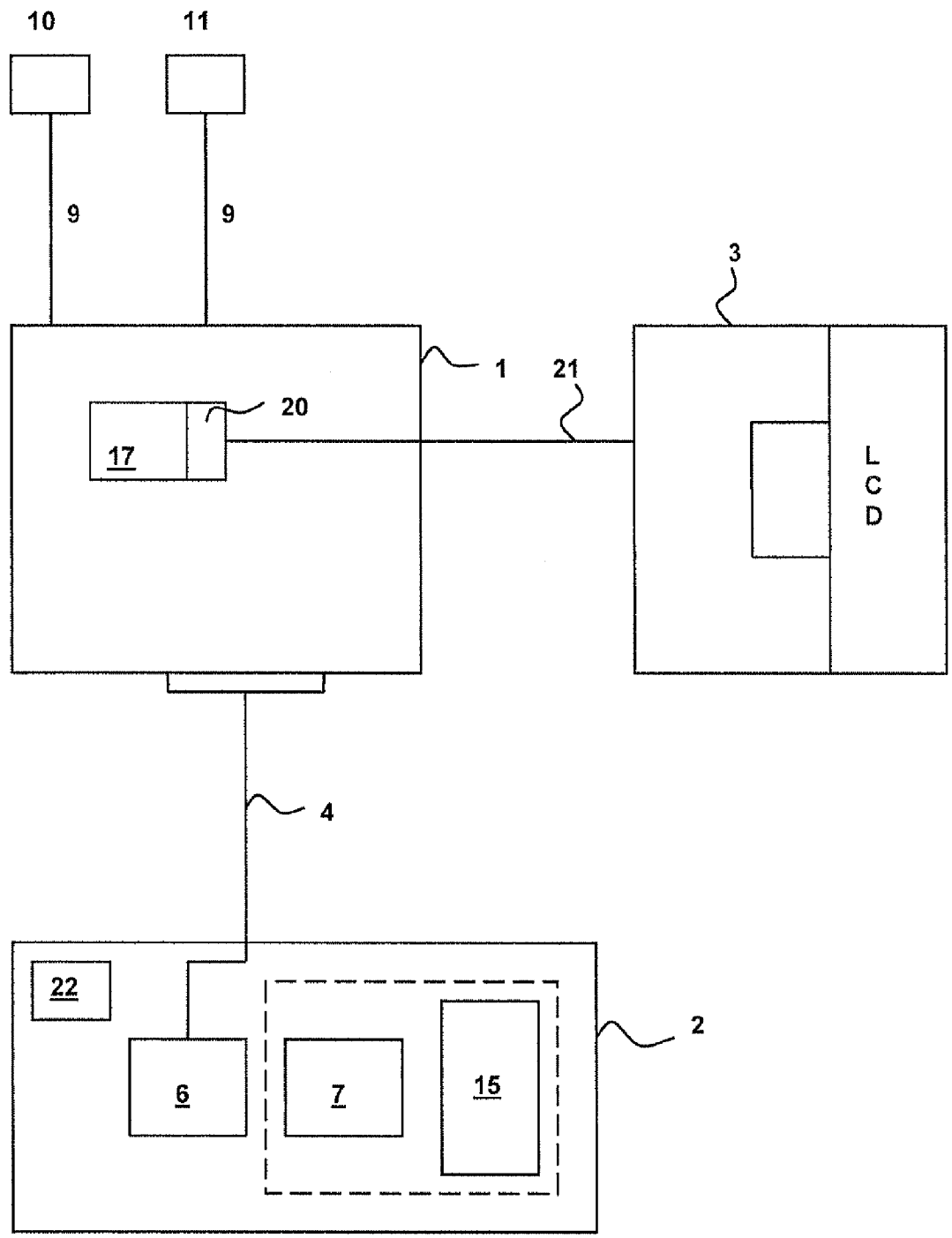
FIG. 3 is a schematic representation of a third embodiment of the apparatus of the invention.

FIG. 1 shows a schematic representation of a preferred embodiment of the apparatus of the invention for servicing a field device 1 using a remote terminal 2. Field device 1 can be one of the above mentioned field devices, which are independently connected to a bus system 4. Field device 1, however, can also especially be a control/evaluation unit, to which a number of sensors/actuators 10, 11 are connectable via corresponding channels. Such an embodiment is shown in FIG. 3. A corresponding control/evaluation unit, which earlier lacked the embodiment of the invention, but which is suitable for the control and evaluation of a number of sensors/actuators 10, 11, is made and sold by the Endress+Hauser Group under the mark LIQUILINE.

The remote terminal 2 can be a PC, a configuration/management system, for example, the configuration system FieldCare, which is made and sold by the assignee, or any handheld servicing device.

Remote terminal 2 and the field device 1 communicate with one another via a bus system 4 using a defined transmission protocol. Such protocols include, especially, the HART protocol, the Profibus PA protocol, the Fieldbus Foundation protocol or, preferably, the TCP/IP protocol. Of course, the protocol can also be a proprietary protocol of the field device manufacturer.

Moreover, bus system 4 can also be embodied as both hardwired as well as wireless. A generator 19 for the creation of dynamically produced contents 20 and a web server 5 are integrated in field device 1. The web server makes each piece of device information of field device 1 requested from remote terminal 2 available to remote terminal 2 in the form of dynamically produced contents 20 via at least one transmission protocol 4. The device information, e.g the firmware, is stored in the memory unit 16 in field device 1. The dynamically produced contents 20 are, for example, web pages.

At least one communication driver 6 specific to the applied transmission protocol and a browser 7, a standard display browser for example, are integrated in remote terminal 2. The browser 7 can call the information of field device 1, for example, the requested parameter to be displayed, from field device 1. The communication driver 6 emulates the protocol of the onsite display/servicing capability 3 of field device 1 on the display/servicing capability 15 of remote terminal 2, so that the dynamically, thus currently, produced contents 20 or web pages are displayed on remote terminal 2 by browser 7. In this way it is assured that the onsite display/servicing 3 capability on field device 1 and display/servicing capability 15 on remote terminal 2 are identical at any time. The emulation is achieved in that the protocol of the onsite display 3 of the field device 1 is provided to remote terminal 2, e.g. a control unit, via the bus system 4.

Preferably, the browser, e.g. the web browser, can be encapsulated in a device driver 6, 22. This DTM can also be a communication driver 6 or a usual device driver 22. Preferably, the browser is a standard browser, e.g. Firefox or Internet Explorer.

An alternative provides that the dynamically produced contents 20 are not transmitted to the browser in device driver 6, 22 via bus system 4—this transmission is relatively slow—but instead the web application (JavaScript) is loaded in device driver 6, 22 from field device 1 via bus system 4; then only the data is exchanged with the field device 1 via JSON (Java Script Object Notification). This method is more efficient than the transmission of contents 20 via bus system 4.

Figure 2:
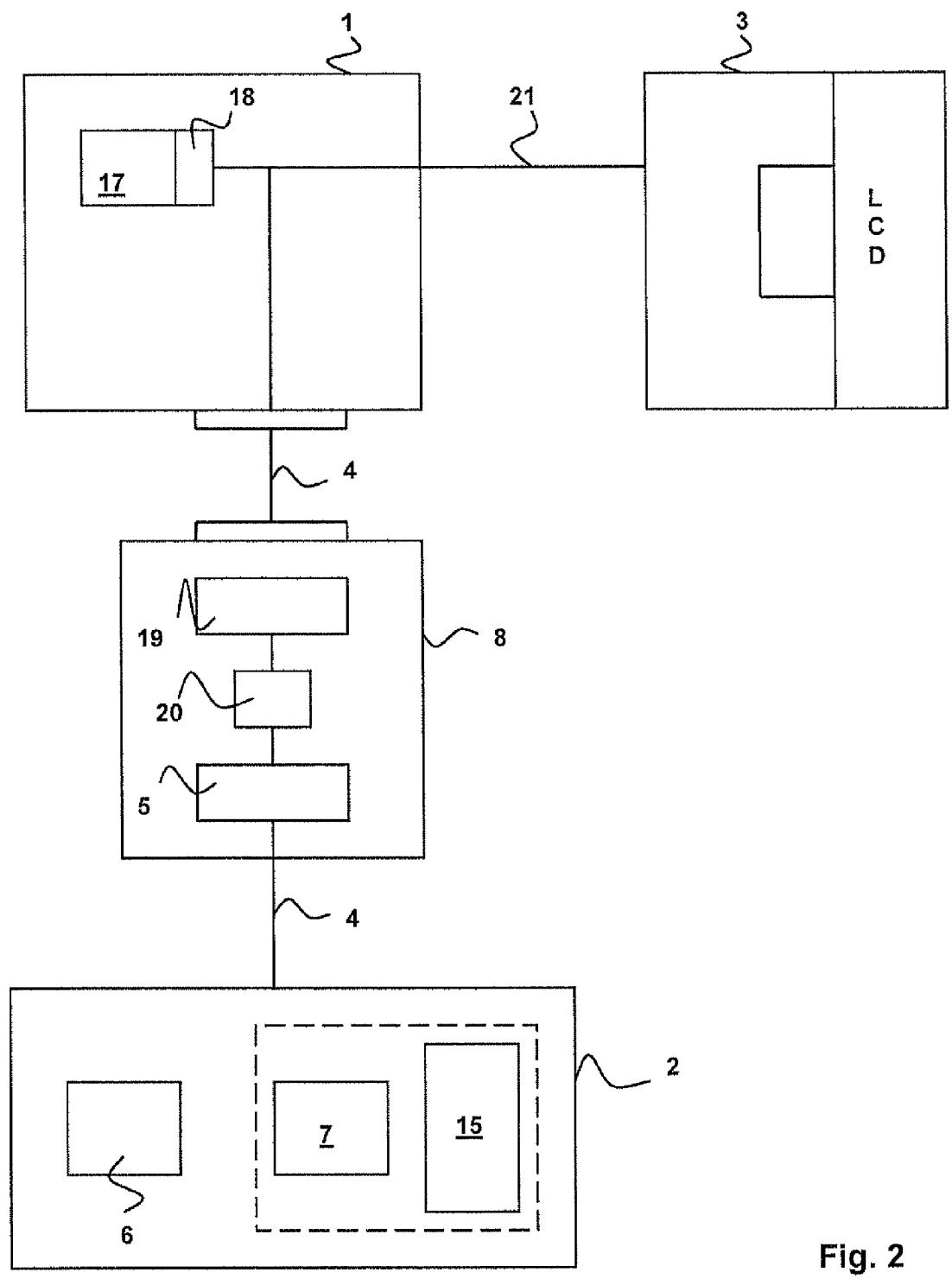
FIG. 2 is a schematic representation of a second embodiment of the apparatus of the invention.

FIG. 2 shows a schematic representation of a second embodiment of the apparatus of the invention. In contrast to the variant illustrated in FIG. 1, here the generator 19, the produced contents and the provision of contents 20 are shifted via the web server 5 into a Plant Access Point 8 or into a gateway. In the state of the art a Plant Access Point—PAP—is utilized in order to provide servicing personnel of the system user with data from field devices, e.g. generic information such as profile information, measured values or device specific information, which were earlier configured. The provision of data occurs either by means of HTML pages, XML files or device drivers. The servicing can also occur via an online Plant Asset Management tool. Such Plant Asset Management tools are, for example, FieldCare of the Endress+Hauser Group or PDM of Siemens.

A PAP webpage or a corresponding content 20 is provided with the help of an emulation of the onsite servicing capability 3 of field device 1. The content 20 is connected to the browser of any client, e.g. via a TCP/IP connection. The emulation is preferably achieved in that the display protocol of field device 1 is provided to PAP 8 via bus system 4. This makes the information available to web server 5 as contents 20 or web pages.

FIG. 3 shows a variant of the apparatus of the invention in which the dynamic production of contents 20 does not occur in field device 1 or in PAP 8, but in remote terminal 2 instead. Here web server 5 and generator 19 for the production of contents/web pages 20 can be omitted in field device 1, since these are permanently integrated in driver 22. This alternative is very advantageous since the dynamic production of contents/web pages 20 in field device 1 or in PAP 8 and their transmission via the bus system 4 leads to a relatively slow representation of contents 20 on remote terminal 2.

In FIG. 1, FIG. 2 and FIG. 3, servicing is provided device driver independently with the assistance of an emulation of the onsite servicing capability 3 of field device 1; the servicing capability is transmitted to a client, for example, remote terminal 2, via a hardwired connecting line. In advantageous embodiments, the hardwired connecting line can be replaced by a wireless connection, thus a radio connection. For example, the radio connection can be a wireless HART connection. The client is, for example, a handheld servicing device or a remote terminal, which supports wireless HART communication. The emulation is achieved in that the display protocol of field device 1 is provided via the wireless HART communication. By attaching a local wireless adapter, it is possible at any time to convert a hardwired conventional field device to a radio field device.

The wireless HART connection can be produced, for example, via a selection list, which is provided by a wireless HART gateway. Alternatively, all information required for the connection to the wireless HART field device 1 can be made available by an RF/ID chip 12, 13.

Although a wireless HART connection was referenced in the preceding, of course, other wireless connections, such as WLAN, for instance, can also be used in connection with the apparatus of the invention and its different embodiments.

The invention claimed is:

1. A system for servicing a field device from a remote terminal in an automation process, comprising:
   said field device for registering and/or influencing a process variable and said remote terminal, wherein
   said remote terminal and said field device communicate with one another via a bus system of process automation technology using a transmission protocol,
   the field device has an onsite display and servicing capability and is linked to said bus system;
   the remote terminal has a display and servicing capability, and has at least a communication driver specific to said transmission protocol, and a browser, said communication driver and said browser being integrated in the remote terminal;
   a JavaScript web application is loaded in the communication driver from the field device via the bus system;
   a web server is integrated in the field device, the web server provides all requested device information of the field device in the form of dynamically produced contents to the remote terminal via JavaScript Object Notation (JSON) so that the dynamically produced contents are displayed on the display of the remote terminal via the browser and on the onsite display of the field device, and
   the onsite display and servicing capability on the field device and the display and servicing capability on the remote terminal are identical at any time.

2. The system as claimed in claim 1, wherein:
said browser is integrated in a separate driver or in a generic communication driver.

3. The system as claimed in claim 1, wherein:
said remote terminal is a PC, a configuration/management system or a handheld servicing device.

4. The system as claimed in claim 1, wherein:
said transmission protocol on the fieldbus plane is a conventional fieldbus protocol used in process automation.

5. The system as claimed in claim 4, wherein:
said fieldbus protocol is, the HART protocol, the Profibus PA protocol, the Fieldbus Foundation protocol or a proprietary protocol of the field device manufacturer or another protocol, such as TCP/IP or USB.

6. The system as claimed in claim 1, wherein:
the field device is a control/evaluation unit, which has a number of channels, via which sensors/actuators are connected.

7. The system as claimed in claim 1, wherein:
said bus system is a wireless HART communication connection.

8. The system as claimed in claim 7, wherein:
the connection to a wireless HART field device is produced via a selection list by means of a wireless HART gateway.

9. The system as claimed in claim 7, further comprising:
an RF/ID chip, which provides information required for connection to the field device.

* * * * *